US006879718B2

(12) United States Patent
Hullender

(10) Patent No.: US 6,879,718 B2
(45) Date of Patent: Apr. 12, 2005

(54) EFFICIENT METHOD AND SYSTEM FOR DETERMINING PARAMETERS IN COMPUTERIZED RECOGNITION

(75) Inventor: Gregory N. Hullender, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 668 days.

(21) Appl. No.: 09/993,077

(22) Filed: Nov. 6, 2001

(65) Prior Publication Data

US 2003/0086612 A1 May 8, 2003

(51) Int. Cl.⁷ .............................................. G06K 9/00
(52) U.S. Cl. ............. 382/187; 365/189.01; 365/230.01; 382/186; 382/209; 382/227; 382/229; 704/231; 706/20; 706/21
(58) Field of Search ................... 365/189.01, 230.01, 365/230.03; 382/181, 186, 187, 190, 209, 216, 218, 224, 227, 228, 229; 704/231, 245, 256; 706/15, 16, 20, 21

(56) References Cited

U.S. PATENT DOCUMENTS

| | | | | | |
|---|---|---|---|---|---|
| 5,644,652 | A | * | 7/1997 | Bellegarda et al. | 382/186 |
| 5,896,321 | A | * | 4/1999 | Miller et al. | 365/189.01 |
| 5,960,101 | A | * | 9/1999 | Lo et al. | 382/125 |
| 6,035,062 | A | * | 3/2000 | Takasu et al. | 382/187 |
| 6,122,401 | A | * | 9/2000 | Nagao | 382/216 |
| 6,233,354 | B1 | * | 5/2001 | Nakatani | 382/224 |
| 6,418,239 | B1 | * | 7/2002 | Hullender et al. | 382/229 |
| 6,502,082 | B1 | * | 12/2002 | Toyama et al. | 706/16 |
| 6,594,393 | B1 | * | 7/2003 | Minka et al. | 382/218 |
| 6,671,403 | B1 | * | 12/2003 | Takasu et al. | 382/187 |
| 6,804,396 | B2 | * | 10/2004 | Higaki et al. | 382/181 |

OTHER PUBLICATIONS

Cho, Sung–Bae. Pattern Recognition with Neural Networks Combined by Genetic Algorithm. Fuzzy Sets and Systems 103 (1999). pp. 339–347.

Yeung et al. "Neocognitron Based Handwriting Recognition System Performance Tuning Using Genetic Algorithm." 1998 IEE International Conference on Systems, Man and Cybernetics. pp. 4228–4233.

Guyon et al. "Capacity Control in Linear Classifiers for Pattern Recognition." IEEE Computer Society Press. 1 IAPR International Conference on Pattern Recognition. 1992. pp. 385–388.

Said et al. "A New Back–Propagation Learning Algorithm with Application to Unconstrained Handwritten Character Recognition." World Congress on Neural Networks. vol. 2. 1995 International Neural Network Society Annual Meeting. pp. 217–221.

* cited by examiner

Primary Examiner—Bhavesh M. Mehta
Assistant Examiner—Gregory Desire
(74) Attorney, Agent, or Firm—Microsoft Corporation

(57) ABSTRACT

In computerized recognition having multiple experts, a method and system is described that obtains an optimum value for an expert tuning parameter in a single pass over sample tuning data. Each tuning sample is applied to two experts, resulting in scores from which ranges of parameters that correct incorrect recognition errors without changing correct results for that sample are determined. To determine the range data for a given sample, the experts return scores for each prototype in a database, the scores separated into matching and non-matching scores. The matching and non-matching scores from each expert are compared, providing upper and lower bounds defining ranges. Maxima and minima histograms track upper and lower bound range data, respectively. An analysis of the histograms based on the full set of tuning samples provides the optimum value. For tuning multiple parameters, each parameter may be optimized by this method in isolation, and then iterated.

22 Claims, 12 Drawing Sheets

EFFICIENT METHOD AND SYSTEM FOR DETERMINING PARAMETERS IN COMPUTERIZED RECOGNITION

FIELD OF THE INVENTION

The present invention relates generally to computing devices, and more particularly to computer recognition of handwritten or other input recognizable as text or other symbols.

BACKGROUND OF THE INVENTION

Contemporary computing devices allow users to enter handwritten words (e.g., in cursive handwriting and/or printed characters), characters and symbols (e.g., characters in Far East languages). The words, characters and symbols can be used as is, such as to function as readable notes and so forth, or can be converted to text or similar computer codes for more conventional computer uses. To convert to text, for example, as a user writes strokes representing words or other symbols (chirographs) onto a touch-sensitive computer screen or the like, a handwriting recognizer (e.g., trained with millions of samples, employing a dictionary, context and/or other rules) is able to convert the handwriting data into separate characters, dictionary words or symbols. In this way, users are able to enter textual data and/or other computer symbols without necessarily needing a keyboard. Speech recognizers may be arranged to operate in a similar manner.

One type of recognizer returns a list of recognition candidates, each candidate having an associated score corresponding to a probability between zero and one-hundred percent that its associated candidate is correct. For purposes of programming and mathematical convenience, the probability score may be returned as a negative natural log of the probability percentage, with the highest probability candidate having the lowest associated value. Because in this instance a smaller score corresponds to a better match, the score is sometimes referred to as a cost, with the lowest cost indicating the best match.

One such recognizer comprises multiple recognition components, each referred to as an expert. Multiple experts can improve recognition accuracy by having each expert compute various input features and provide a result set of candidates and scores, with a final result set of candidates and scores produced by mathematically combining the result sets of each expert. For example, in a negative natural log configuration, scores from each expert are added together to produce a final result set. In this way, user input is analyzed by multiple experts, which may have very different ways of analyzing (e.g., featurizing) the input to produce their respective alternatives, which can significantly increase recognition accuracy.

One problem with this approach is that instead of improving the overall recognition accuracy relative to one expert's result, the other expert or experts can reduce accuracy. For example, consider handwriting input intended to represent the letter "S" and correctly recognized (i.e., given the lowest cost score) by one expert. Another expert, for example, may recognize the input as most likely being the number "5" with a value that is sufficiently low enough relative to the score for the "S" so as to change the other expert's formerly correct guess when the result sets are combined.

In order to improve overall recognition results, the weight of each expert can be tuned relative to each other expert. A straightforward way to do this is to multiply each expert's result set by a weight constant determined for it, which may be a fraction. Then, when mathematically combining one expert's scores with the scores of one or more other experts, certain of the experts will have less influence on the result. For example, in a two-expert recognizer, one expert can be considered more influential and weighted as one (no multiplier needed), while another expert's results can be halved, i.e., the first expert's score can be summed with half the secondary expert's score to produce its final recognition result set.

A problem with this approach is determining the optimum constant to use as a weight factor, which may need to be determined fairly often, since additional samples may be obtained, or as recognizer technology evolves into new types of experts. While this may seem to be a straightforward empirical experiment, (e.g., try each possible value and see which one best improves overall accuracy on a set of sample data), this is computationally expensive, because with millions of samples, a single test run can take many hours, even with relatively powerful computing devices, and many such parameter values need to be evaluated to find an optimum one. For example, consider tuning a secondary expert (with the other expert not multiplied) by taking every possible multiplying constant (e.g., from 0.001 to 1.000) for that secondary expert, and trying each one against sample set of millions of chirographs to see which constant provides the best overall recognition accuracy. Such a thousand-pass trial may take days or weeks to run, and may have to be repeated each time new samples are obtained or an expert is modified. Moreover, such a trial-and-error solution becomes exponentially more costly with three or more experts.

SUMMARY OF THE INVENTION

Briefly, the present invention provides a system and method that obtain an essentially optimum value for a tuning parameter in a single pass over the sample data, and also provides methods for tuning several parameters at once. In general, this is accomplished in an expert-based recognition system by applying a set of tuning samples separately to two experts, and for each sample, determining a range of parameter values (if any exists) within which the recognizer will obtain the correct result. An analysis of the range data based on the full set of tuning samples provides the optimum value.

To determine the range data for a given sample, the experts return a score for each prototype in the prototype database. The scores from the first expert are separated into first matching and first non-matching scores, depending on whether each given prototype was labeled with the same meaning (e.g., code point) as the sample. Similarly, the scores from the second expert are separated into second matching and second non-matching scores. For each first matching, second matching element, a respective comparison is performed against each first non-matching, second-non matching element.

While looping through the combinations, if for a given prototype the comparisons indicate that the first matching score and second matching scores are better than the first non-matching score and the second non-matching score, respectively, then the non-matching prototype scores are removed from the non-matching sets, since the recognizer will never choose this non-matching prototype above the matching one, regardless of the parameter value.

If the first matching score and second matching scores are not better than the first non-matching score and the second non-matching score, respectively, then no parameter value will be able to make the recognizer get the answer correct for this particular matching prototype, and thus a new matching element is selected for testing against the set of non-matching elements.

If the first matching score is better than the first non-matching score but the second matching score is not better than the second non-matching score, then an upper bound exists on the range, above which a parameter value does not improve recognition accuracy for this sample. The upper bound is calculated by the formula:

Upper Bound=(Expert1Match−Expert1NoMatch)/ (Expert2NoMatch−Expert2Match)

for these two matching and non-matching elements. As this matching element is compared against the other non-matching elements, the lowest upper bound for this matching prototype (if more than one is calculated) is kept in a range array.

Lastly, if the first matching score is not better than the first non-matching score but the second matching score is better than the second non-matching score, a lower bound on the range exists, calculated by the formula:

Lower Bound=(Expert1NoMatch−Expert1Match)/(Expert2Match− Expert2NoMatch)

for this particular pairing of matching and non-matching prototype elements. As this matching element is compared against the other non-matching elements, the highest lower bound (if more than one is calculated) for this matching prototype is kept in a range array.

When the comparisons are complete for a given matching element, the process is repeated for each other matching element, restarting at the top of the list of non-matching elements, (a list which is typically reduced, since the comparisons often indicate that the first matching score and second matching scores are better than the first non-matching score and the second non-matching score for many of the non-matching elements, whereby the non-matching elements are removed). During the various loops through the elements, some of the matching elements will have upper and/or lower bounds when compared against the non-matching elements, whereby a set of ranges will be added to the range array for this sample.

Once the set of valid weight ranges for is established for the sample, a union of the ranges is taken, by starting with the first range in the range array, and checking it for overlap with every range below it in the range array. In the event of an overlap, the ranges are merged and the overlapping range deleted, until no merges can occur with this first range. Then, the process is repeated with the next range, if any, until no overlapping ranges exist.

For each (disjoint) range, a counter (cell) corresponding to the lower bound is incremented in a minima histogram, and a counter (cell) corresponding to the upper bound is incremented in a maxima histogram. Any out-of-range values are incremented in the first or last cell as required. At this point, processing of this sample is complete, whereby the next sample from the tuning set is selected until none remain.

When finished with the pass through the set of tuning samples, the histogram contains the range data determined from the samples in the above manner. A final calculation loops across both histograms from lowest to highest entry, keeping a running total that is computed by adding the values from the minima histogram and subtracting the corresponding values from the maxima histogram up to each given parameter. Each total corresponds to the number of samples that will be scored correctly at that weight, of those samples that can be influenced by weight. The maximum value of these running totals is tracked, together with the histogram index where it occurs. At the end of the loop, the index associated with that maximum is the optimal weight.

For tuning multiple parameters, each parameter is optimized in isolation via the above-described single pass tuning method and system, and then fine-tuned by iteration, first using the values determined in isolation, and then using the values determined in subsequent tuning iterations. Because each optimization pass is so efficient relative to other methods, such iterations are possible in reasonable times, and the parameters converge very quickly on the correct values.

Other advantages will become apparent from the following detailed description when taken in conjunction with the drawings, in which:

DETAILED DESCRIPTION

Exemplary Operating Environment

Figure 1:
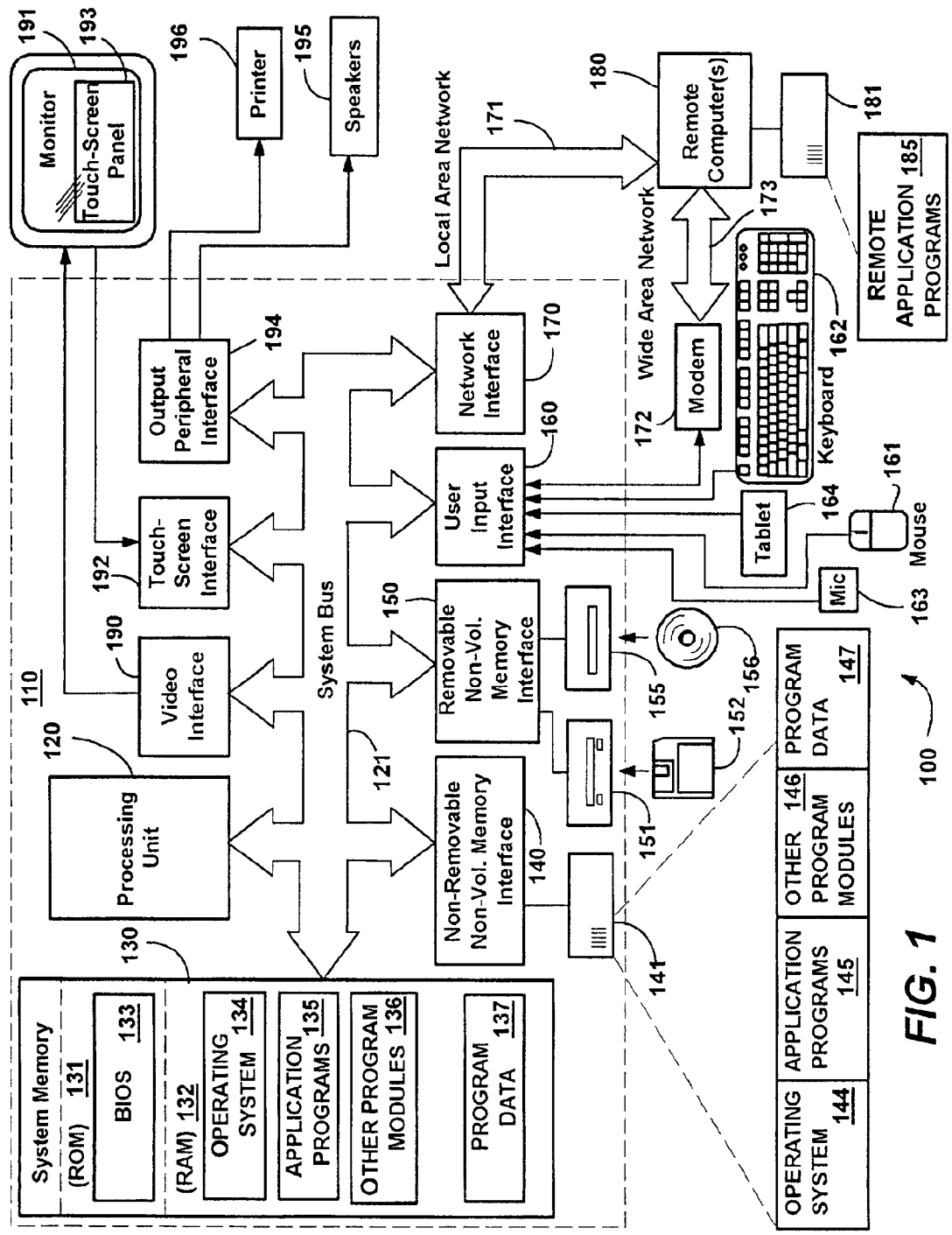
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Tuning Recognition Parameters

The present invention is primarily directed to tuning recognizers, such as handwriting or speech recognition engines, and in particular recognizers of a type referred to as a K-Nearest-Neighbor (K-NN) recognizer having two or more tunable experts therein. In one implementation, the present invention efficiently determined linear parameters for a Japanese character handwriting recognition system, however the present invention has been found to have benefits in other types of recognition systems.

One such K-NN handwriting recognizer is arranged for symbol recognition, and operates by taking a representation of online electronic ink as input. Based on features determined from the electronic ink, the recognizer produces a set of Unicode characters or the like as output selections, typically ordered from most likely to least likely, e.g., the first character listed in the set is the top choice of the recognizer. Associated with each character is a score, which corresponds to a probability that that character is a correct match. As used herein, a smaller score corresponds to a better match, but it is equivalent to arrange the output vice-versa.

Figure 2:
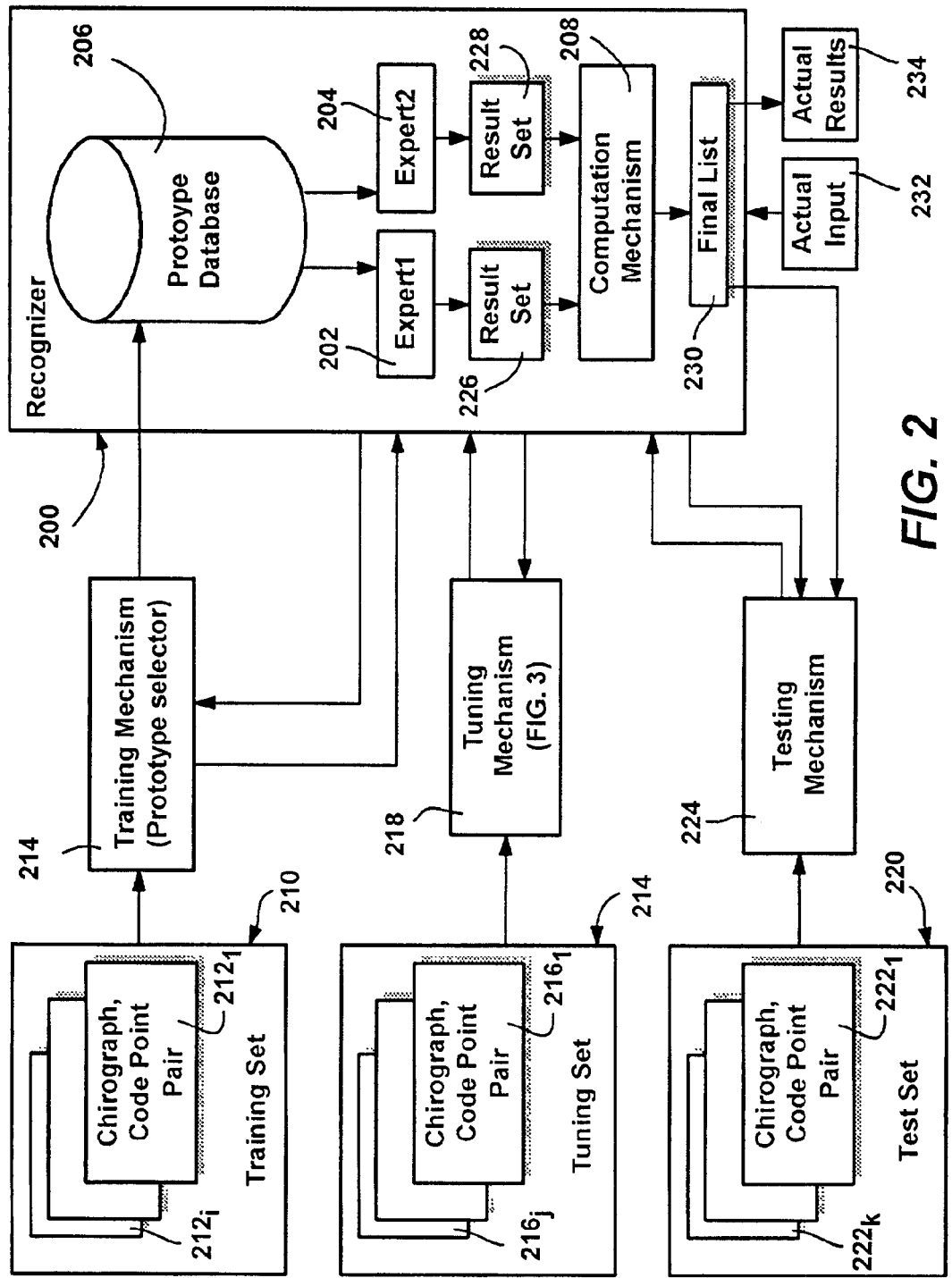
FIG. 2 is a block diagram generally representing components for providing a tuned recognizer, including components for efficiently tuning an expert in the recognizer in accordance with an aspect of the present invention.

As generally represented in FIG. 2, the programming code of a suitable recognizer 200 contains a set of experts, expert1 202 and expert2 204, each of which comprises an algorithm that featurizes a sample of online ink (i.e. converts it from a sequence of x–y points into a string of symbols). Each expert then computes scores for the sample by comparing the sample's features as featurized thereby against prototype features maintained in a prototype database 206. Once each expert's scores are computed, the recognizer 200 mathematically combines them into a final score via a computation mechanism 208.

The recognizer 200 thus can be considered as including a data portion containing the list of prototypes in a database or the like 206, where each prototype is typically constructed in a development environment from a known sample of ink. Each prototype comprises the corresponding feature strings for that ink sample in association with the meaning (e.g., Unicode character) that it represents. To this end, the prototypes in the database 206 are selected from a training set 210 of samples $212_1$–$212_j$ by a training mechanism 214 based on some set of criteria. Each sample is typically arranged as a chirograph, and code point pair, (wherein the code point is the Unicode character that the chirograph is supposed to represent). Note that the training process 214 may be manual, at least in part, e.g., visually examine the samples for ones that are fairly representative and add those to the database, however automated processes that improve recognition accuracy have been developed, e.g., run one set of samples against various sets of prototypes selected from other samples, and keep the prototype set that gives the best results. Alternatively, at least some of the prototypes can be constructed rather than selected from samples. As will be understood, the present invention is independent of any particular way in which the recognizer 200 is trained, (i.e., the way the prototypes are selected), and thus training will be only generally referred to herein.

For training, tuning and testing purposes, sample data may be divided into the training set 210, used to build the components of the recognizer as described above, a tuning set 214, used by a tuning mechanism 218 in accordance with the present invention as described below, and a test set 220, used by a testing mechanism 224 to evaluate the final recognition product in order to ensure that recognition accuracy improves with various prototype sets and calculated tuning parameters (described below). Note that various techniques such as cross validation can reduce the amount of data needed. As with training, the present invention is independent of any particular testing of the recognizer, and thus testing will be only generally referred to herein.

Once built and tested, in actual operation, the K-NN recognizer 200 generally works by featurizing actual input ink 232, and comparing it against each prototype in the database 206, using each expert 202, 204 to obtain their respective result sets 226, 228. The computation mechanism 208 combines their result sets (e.g., linearly) to compute a list 230 of unique Unicode characters and scores. At least part of the list 230 (e.g., the ten best characters and their scores) is output as actual results 234, such as to an operating system component and/or application program. This type of recognizer 200 is thus a K-NN (actually 1-NN) system.

In accordance with one aspect of the present invention, the tuning mechanism 218 provides an efficient tuning method and system that ultimately tunes the recognizer's experts relative to one another to provide improved overall recognition accuracy. In a recognizer having two experts, (e.g., the experts 202 and 204 as represented in FIGS. 2 and 3), for relative tuning only one tuning parameter needs to be determined, which, without loss of generality, can be considered as a weight parameter to apply to each corresponding one of the second expert's results:

TotalScore=Expert1Score+weight*Expert2Score

The present invention operates to determine this weight in a single pass through the sample data 210, which is highly efficient (e.g., orders of magnitude faster) relative to prior mechanisms (e.g., gradient descent mechanisms) that separately run every possible weight value against the samples and then select the one weight that gave the best results. The single pass solution is accomplished by first determining a range of weights (if any) that correctly recognize each given sample in a tuning set, and then preserving that range data. When each sample in the tuning set has its range established, the range data is analyzed to find a single parameter (weight) value that gives the best overall result.

Figure 3:
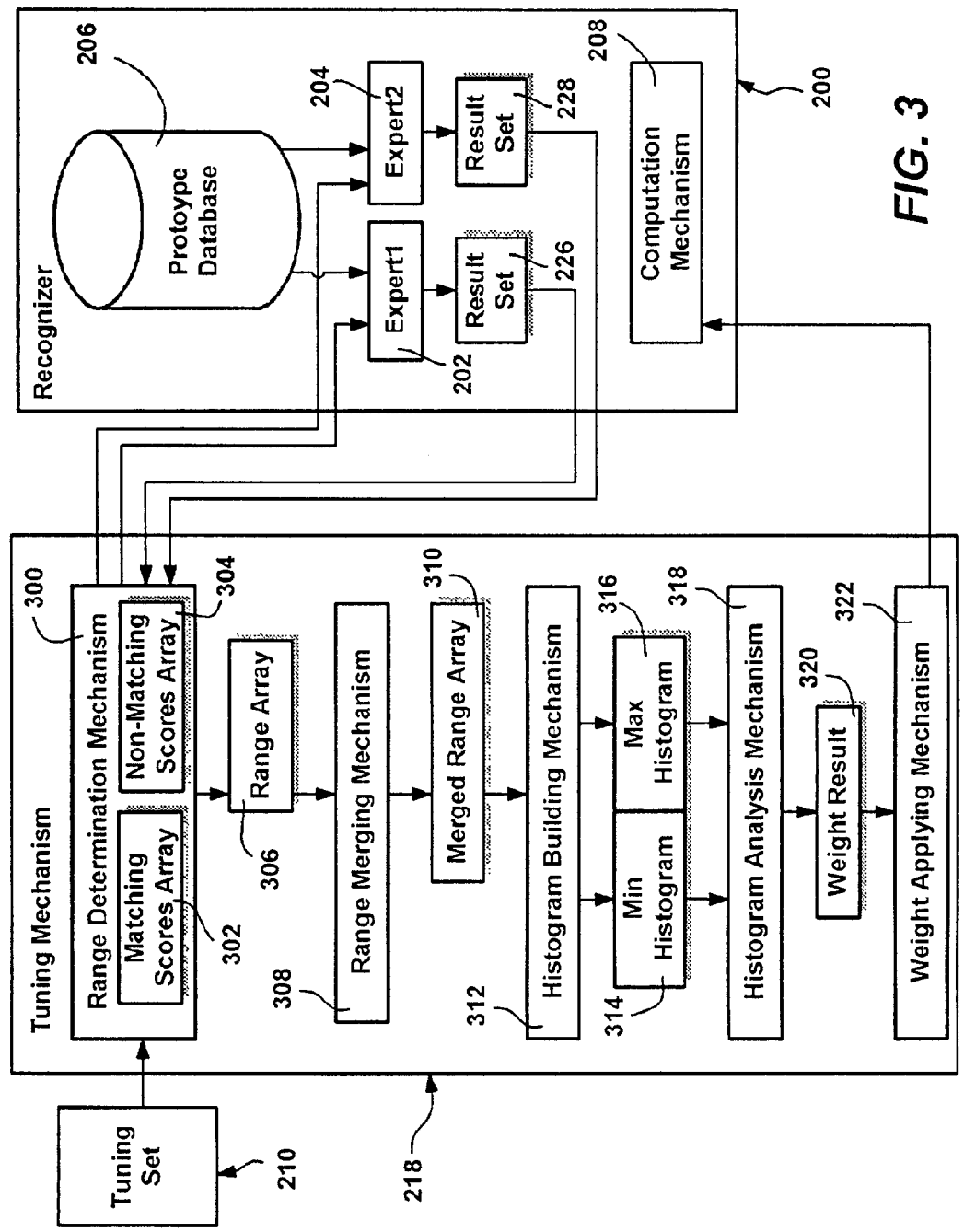
FIG. 3 is a block diagram generally representing components arranged for efficiently tuning an expert in the recognizer in accordance with an aspect of the present invention.

To this end, as represented in FIG. 3, the tuning mechanism 218 of the present invention includes a range determination mechanism 300 that first determines what range of weight values, if any, will make an incorrect result correct for a given sample, while keeping a correct result from being changed to an incorrect one. These ranges are maintained in a range array 302.

In general and as represented in FIG. 3, the range determination mechanism 300 determines the range data by providing each sample to the experts 202 and 204, and separately obtaining their results in respective result sets 226 and 228. Preferably, the experts 202 and 204 separately provide a score for every prototype in the prototype database, although it is feasible to perform some preprocessing to eliminate scores that are so high (bad) as to not have a reasonable chance of influencing the parameter value ultimately chosen. The results are sorted into a matching scores array 302 of expert1, expert2 score pairs, per prototype, for prototypes labeled with a code point value that matched the sample's labeled code point value, and a non-matching scores array 304 for those that did not match.

In accordance with one aspect of the present invention, the tuning mechanism first operates to find the optimal weight range for a given sample. In general, the range determination mechanism 300 compares each of the matching prototype scores against the non-matching scores (as described below), and separates them into four possible cases, namely, 1) the recognizer will get the answer correct regardless of K; 2) the recognizer will be incorrect regardless of K; 3) the recognizer is correct when K=0 (equivalent to no second expert) but is incorrect for some other values of K; and 4) the recognizer is incorrect when K=0 (equivalent to no second expert) but is correct for some values of K.

By way of example, and using only three prototypes (one matching) and whole number scores for simplicity, wherein a lower number represents a better match, consider a sample with code point "S" for which the following hypothetical scores are generated:

TABLE 1

| Character | Expert1 Score | Expert2 Score |
|---|---|---|
| S | 100 | 100 |
| 5 | 120 | 110 |
| g | 150 | 300 |

As can be seen, such scores correspond to case 1) above, i.e., the answer will be correct regardless of the weight constant K, since (when K is positive) there is no possible value for K that will produce a result less than the sum of expert1's score and K times expert2's score. As can be readily appreciated, such a sample will not help determine K to tune expert2, and thus such a sample ultimately will be ignored, as described below.

Alternatively, it is possible that the scores provided by the experts are incorrect to a point such that no value of K will get the result correct. For example, with a different sample that is identified as being intended to represent the "S" character, hypothetical scores might be:

TABLE 2

| Character | Expert1 Score | Expert2 Score |
|---|---|---|
| S | 200 | 160 |
| 5 | 100 | 120 |
| g | 190 | 150 |

As with Table 1, no value of K multiplied by expert2's score will be able to change expert1's outcome to provide a score for "S" that is lower than that for the "5" character, and thus such a sample (which may actually look more like a "5" than an "S") will be ignored in determining K.

However, consider the next table of hypothetical scores for a different "S" sample, which illustrates case 3) above, (where K=0 works but some positive values for K get the answer wrong):

TABLE 3

| Character | Expert1 Score | Expert2 Score |
|---|---|---|
| S | 100 | 200 |
| 5 | 120 | 190 |
| g | 150 | 300 |

Clearly if K, the multiplier of the expert2 scores, is greater than two, (e.g., 2.01) the recognizer would get the answer incorrect and output a "5" as its result, since the "S" character's summed and weighted score (e.g., of 502.0) would exceed the "5" character's total weighted score (e.g., of 501.9). Note that this is not true when the "S" character's score is compared against the "g" character's score, since no value of K can change that result, but all it takes is one score (element) to limit K with an upper bound. Thus, this sample, corresponding to an acceptable range for K from zero to two, has an upper bound for K that needs to be considered in determining a value for K that improves, rather than reduces, overall recognition accuracy.

A formula for finding this upper bound for K for any given expert1, expert2 score pair (element) is:

$$E1m_0 + K*E2m_0 < E1n_x + K*E2n_x, \text{ which is equivalent to:}$$

$$K < (E1m_0 - E1n_x)/(E2n_x - E2m_0)$$

where $E1m_0$ and $E2m_0$ represent expert1's and expert2's respective scores for a selected matching element, $E2m_0 > E2n_x$, and $E1n_x$ and $E2n_x$ represent expert1's and expert2's respective scores for a given non-matching element x. While this is true for any one element, the minimum upper bound for the matching prototype's scores needs to be determined against the full set of non-matching prototypes' scores, and thus each of the various element combinations (typically) will be considered in determining K, as described below.

A fourth possibility is that K=0 would get the answer wrong, but some positive K value would fix expert1's result and the answer correct. With yet another "S" sample, the following hypothetical scores may be returned:

TABLE 4

| Character | Expert1 Score | Expert2 Score |
|---|---|---|
| S | 120 | 100 |
| 5 | 100 | 150 |
| G | 300 | 90 |

When K is greater than 0.4, (e.g., 0.41), the weighted and summed result for the "5" character (equal to 161.5) will be higher than that of the "S" character (equal to 160). There is thus a lower bound for this sample. Again, such a sample needs to be considered in determining a value for K that improves, rather than reduces, overall recognition accuracy.

Starting with the same general formula (but ultimately moving K to the greater than side), a formula for finding this lower bound for K for any given expert1, expert2 score pair (element) is:

$$E1m_0 + K*E2m_0 < E1n_y + K*E2n_y, \text{ which is equivalent to:}$$

$$K > (E1n_y - E1m_0)/(E2m_0 - E2n_y)$$

where $E1m_0$ and $E2m_0$ represent expert1's and expert2's respective scores for a selected matching element, $E2m_o > E2n_y$, and $E1n_y$ and $E2n_y$ represent expert1's and expert2's respective scores for a given non-matching element y. Again, this is only the case for one matching elements, as a maximum lower bound for this matching element needs to be determined by comparing its score against the full set of non-matching element scores.

Note that there may or may not be an upper or lower bound for a given sample, however if there is, since each matching element score is compared with each non-matching element score, both will be detected, as will be understood from below. For example, in Table 4, if K gets too large, namely greater than eighteen, the "g" character's score becomes smaller than the "S" character's score and thus the answer would be incorrect. Thus for this sample, there is also an upper bound, and the range of K values that would return the correct answer is between 0.4 and eighteen, (0.4<K<18).

Figure 4:
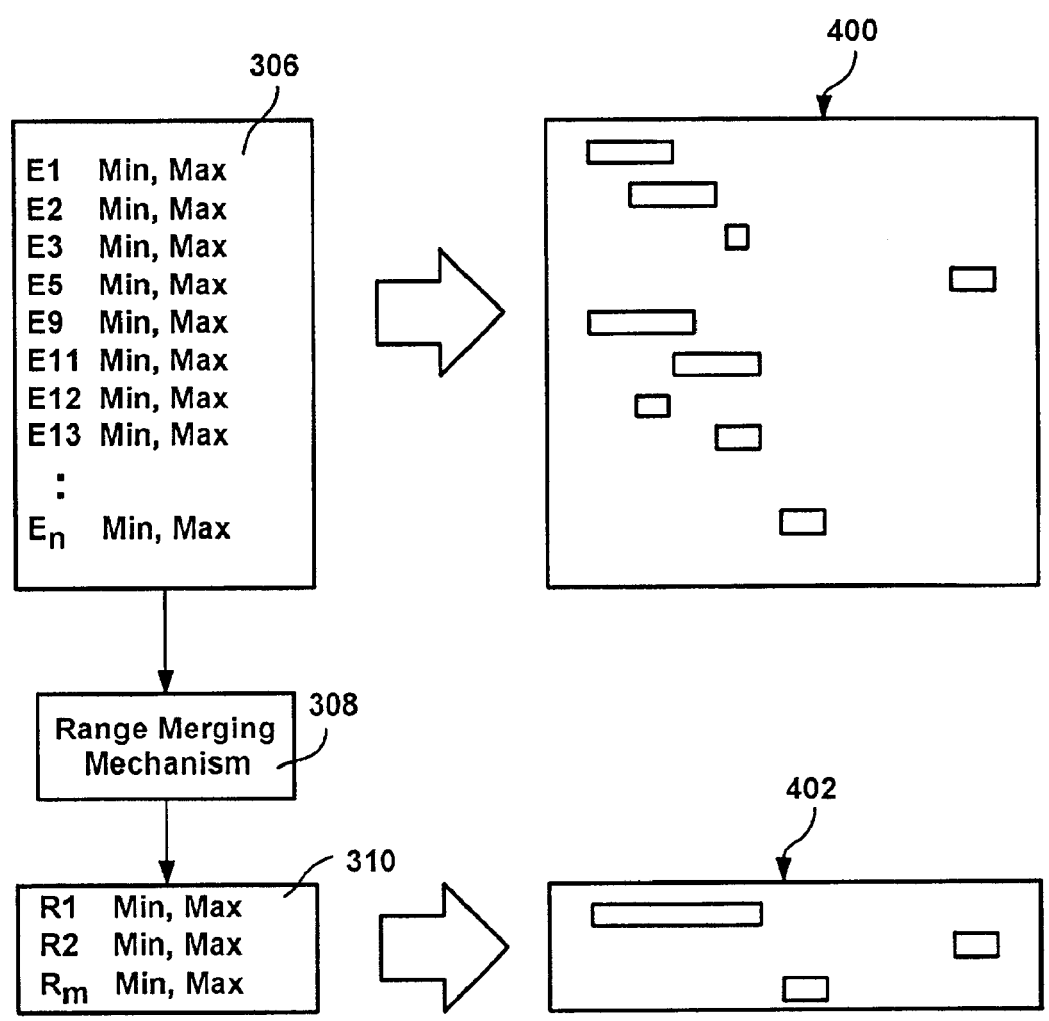
FIG. 4 is a representation of an array of parameter tuning ranges determined for efficiently tuning an expert in accordance with an aspect of the present invention.

In general, the maximum lower bound and minimum upper bound are tracked when evaluating a given matching element, resulting in a range for that element. The next matching element also has a range determined therefor, and so on, resulting in an array of ranges 306 for a given sample. Thus, as described in more detail below with reference to the flow diagrams of FIGS. 7–12, for each matching element, the range determination mechanism 300 determines a range against the set of non-matching elements and stores these in the range array 306. Exceptions are possible that effectively eliminate a sample from determining K, (such as an unbounded range or empty range), but many samples result in a set of ranges maintained in the range array 306. FIG. 4 shows the array 306 with a simplified hypothetical representation 400 of what the ranges might look like relative to one another if graphed in a bar graph-like format.

When a sample has had its ranges determined, a range merging mechanism 308 takes the union of the ranges, essentially so that a range for a sample is only counted once for determining the best K. The merging operation is a transitive closure problem, but a straightforward solution has been found that is relatively efficient.

To merge, the range merging mechanism 308 locates the first range in the array, and individually checks this first range against every range below it in the array to see whether it overlaps. In the event of overlap with any lower range, the ranges are merged into the first range, and the lower range is efficiently deleted, by copying a range from the bottom of the array over it, and shrinking the array by decrementing a count of the range size. So that the copied range is tested, the loop index is also decremented. The process is repeated until this first array cannot be merged with any other ranges below it, that is, it is disjoint (no overlap) with respect to any other ranges below it. At this time, the next range in the array is selected, and the process repeated for ranges below this next range.

The result is a merged range array 310, (which if graphed would appear as the representation 402 in FIG. 4). Note that although this is n*(n−1)/2 operations (where n is the number of ranges) for the worst possible case, (e.g., all entries disjoint), with actual data the first merging pass almost always merges all the ranges together into a single range.

Figure 5:
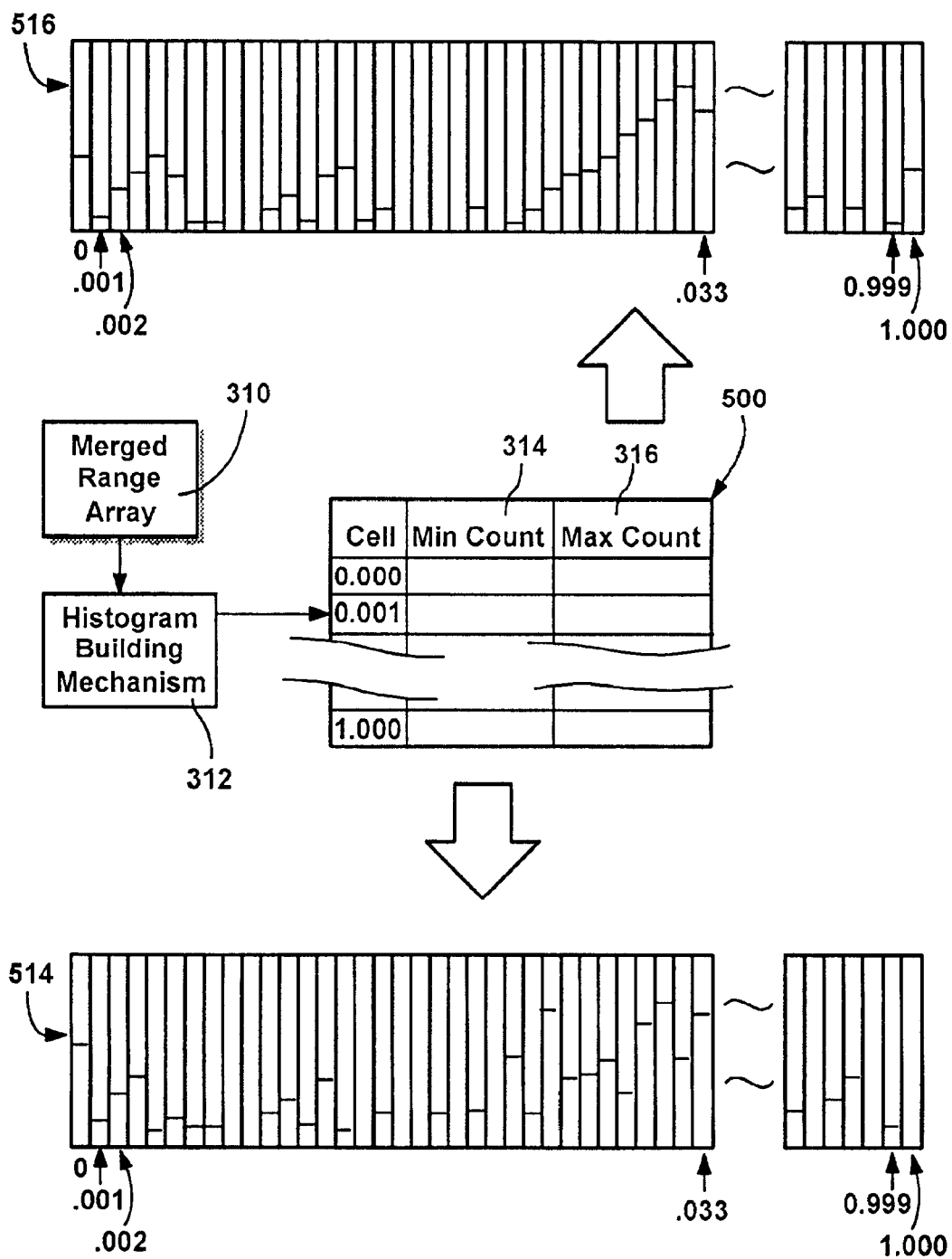
FIG. 5 is a representation of histogram computed for efficiently tuning an expert in accordance with an aspect of the present invention.

Once the merged range array 310 is reduced to a set of disjoint ranges, a histogram building mechanism 312 stores the range data into a minima histogram 314 and maxima histogram 314, which as represented in FIG. 5 can actually comprise a single data structure of arrayed cells 500. Essentially, this range data is stored by incrementing a minimum counter indexed by the lower range value, and a maximum counter indexed by the upper range value for each disjoint range in the merged range array 310. Any out-of-range values are incremented in the first or last cell, as appropriate. Of course, the actual weight numbers may vary depending on the types of values that the experts return, (e.g., factions or whole numbers), and weights may need to be rounded to fit into a histogram cell. A simple analysis of a few score values returned by the experts provides a general idea of the desired weight sizes and the resolution (precision) desired for a histogram.

By way of example, (notwithstanding the simplified whole number examples above), as represented in FIG. 5, each histogram 314, 316 (conceptually represented with hypothetical counts in respective graphs 514 and 516) may have a thousand cells (plus one) as counters distributed in the interval from zero to one, whereby a weight parameter between zero and one will be determined to a 0.001 precision. Of course, it is possible to use finer granularity when incrementing the histogram and then later reduce the resolution (e.g., by summing counts in blocks of ten) after the samples are complete, and it is also feasible to build several histograms having different resolutions to see if one provides a weight that significantly improves overall recognition relative to the other values.

To select the most optimal weight from the histograms 314, 316, a histogram analysis mechanism 318 is provided. In essence, and as described below with respect to FIG. 13, the histogram analysis mechanism 318 walks the counters by summing a running total from the start of the histogram to a given cell, subtracting the count value for each maxima counter from its corresponding minima counter. The maximum of those running totals provides the optimal weight result 320 for this system, which a weight applying mechanism 322 provides to the computation mechanism 208 for use in combining the experts' results.

Returning to FIG. 2, once tuned, the recognizer 200 may be tested by the testing mechanism 224 with test set data 220. Note that it is feasible to run more than one test with a few variations for a more-finer tuning, and/or to overcome any anomalies that might have occurred (such as if too small a precision was used). For example, tests may be run with the selected weight slightly increased and/or decreased, to see if the variation increases recognition accuracy. Note that it is still significantly faster to run a few extra tests around a weight chosen by the method and system of the present invention than to run every possible weight to find the one to choose.

Alternatively, or in addition to, other weights that did not provide the maximum difference in the histogram analysis, but were close (e.g., weights adjacent to the one selected, and/or the second through the tenth nearest maximum may be tested, with possibly the same fine-tuning operation), to see if a better overall result may be obtained. In fact, various resolutions of the histogram differences may be graphed so that a human can quickly see whether the weight was in fact the peak of a general trend toward improved accuracy or a chance spike resulting from some anomaly in the tuning data versus the histogram resolution and weight sizes that may not work well with other data. In practice, however, with sufficient quantities of data, the tuning mechanism of the present invention has provided the correct result the first time, in seconds to minutes as opposed to hours or weeks when dealing with tuning sample sets numbering in the tens of millions of samples.

Figure 6:
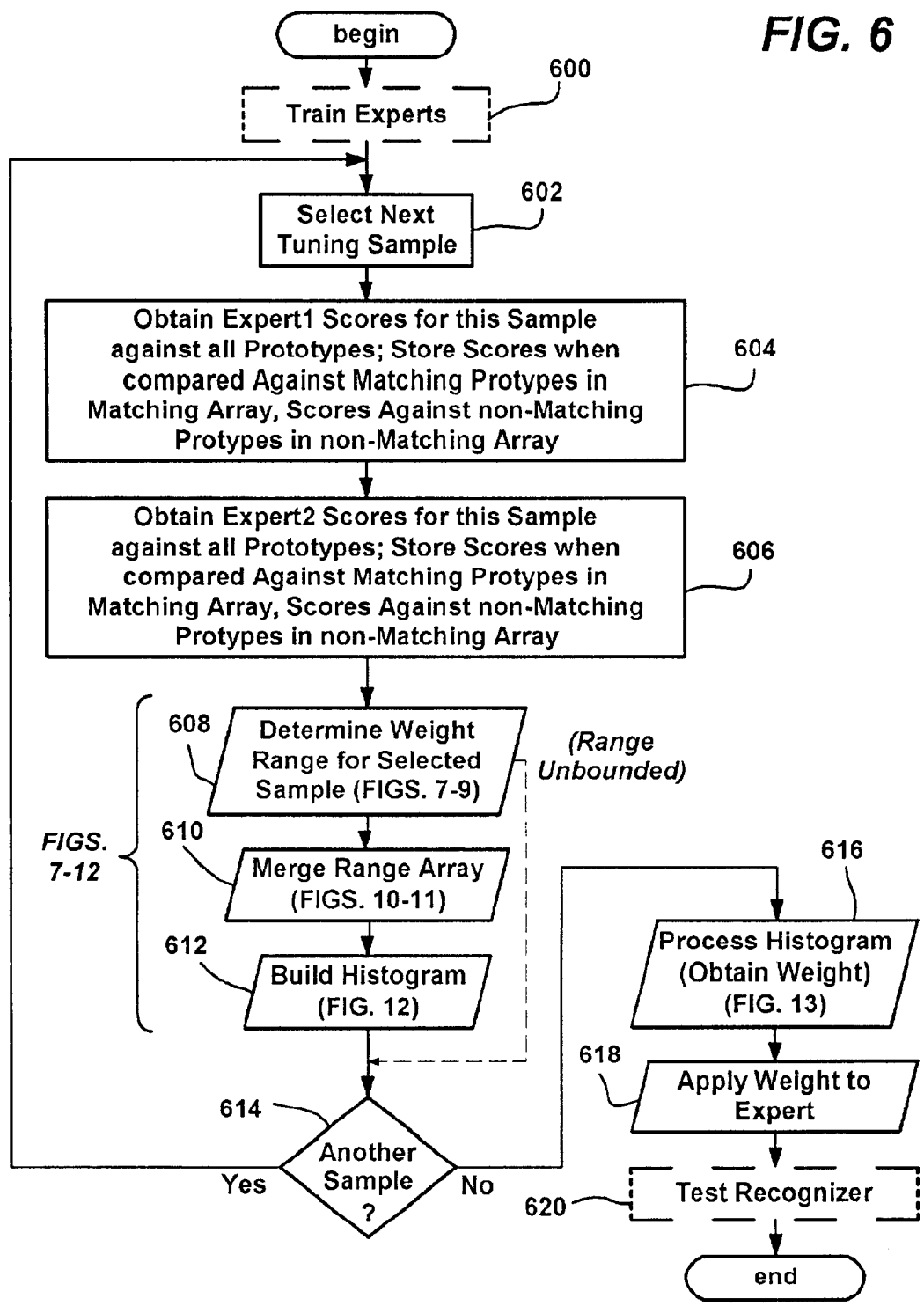
FIGS. 6–13 comprise a flow diagram generally representing the steps taken to efficiently tune an expert in accordance with an aspect of the present invention.

Turning to an explanation of the operation of the present invention with particular reference to the flow diagrams of FIG. 6–13, step 600 represents the initial training of the experts 202, 204, (represented in FIG. 6 as a dashed box because training is independent of the present invention, and many training methods are known). Essentially this corresponds to adding prototype data to the prototype database 206. Although not shown, other pre-tuning initialization also may be done at this time, such as to allocate the various data structures/arrays, initialize the minima and maxima histograms to zero, and so forth.

Step 602 starts the tuning process by selecting a "next" tuning sample, which in this instance is the first one available. Step 604 applies this sample to expert1, and receives scores for this sample evaluated against the set of prototypes in the prototype database 206, both matching and non-matching prototypes. Preferably this is all the scores, but the expert 202 or the range determination mechanism 300 may discard ones that are certain to be meaningless, e.g., keep only the top X matching scores and top Y non-matching scores. The range determination mechanism 300 sorts the scores into ones from prototypes that match the correct sample answer and those that do not match. In any event, step 606 similarly applies the sample to obtain expert2's scores, sorts them into matching and non-matching scores, and preserves the scores received from expert2 when the currently selected sample is applied thereto. Note that for efficiency, rather than sorting matching from non-matching for each sample, it is feasible to have the experts and/or prototype databases arranged such that matching and non-matching scores can be separately returned, however the present invention is sufficiently fast so that such a temporary "tuning-only" modification is unwarranted. At this time, the sample has a list of matching elements for it, and a list of non-matching elements for it, each element comprising the pair of expert1's and expert 2's scores for a given prototype.

Figure 7:
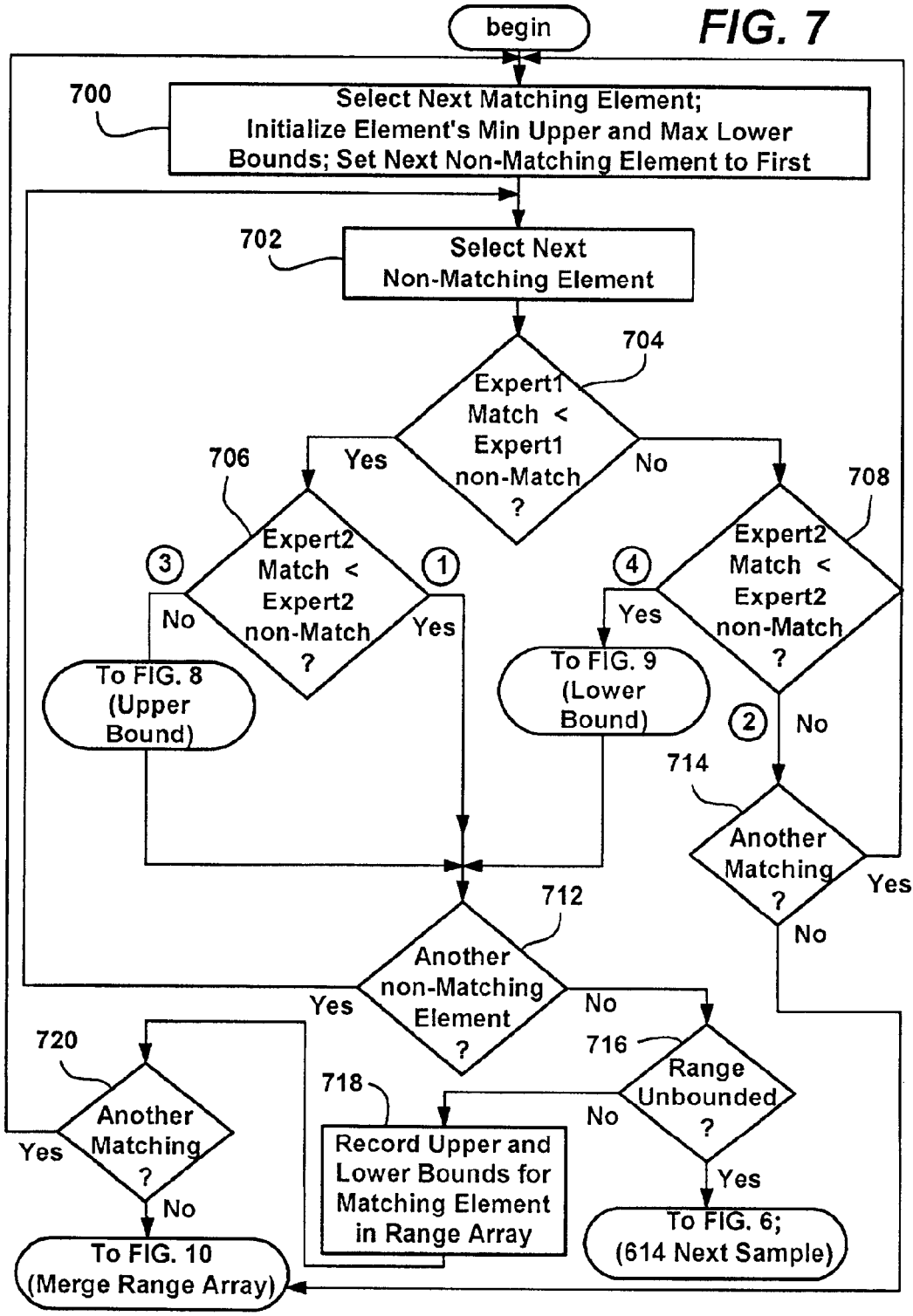
Figure 8:
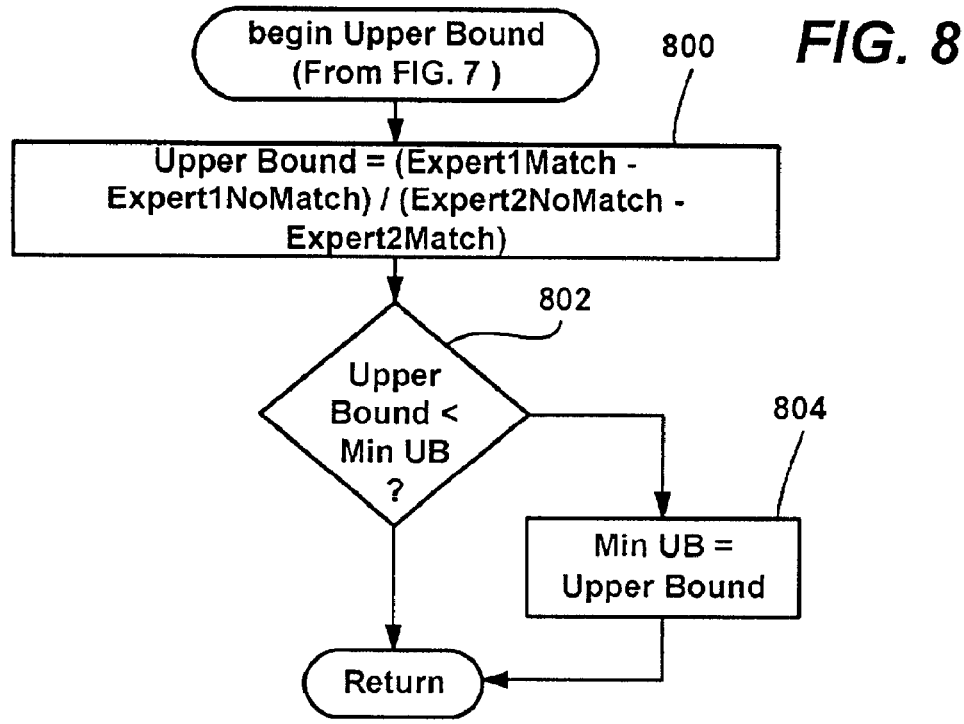
Figure 9:
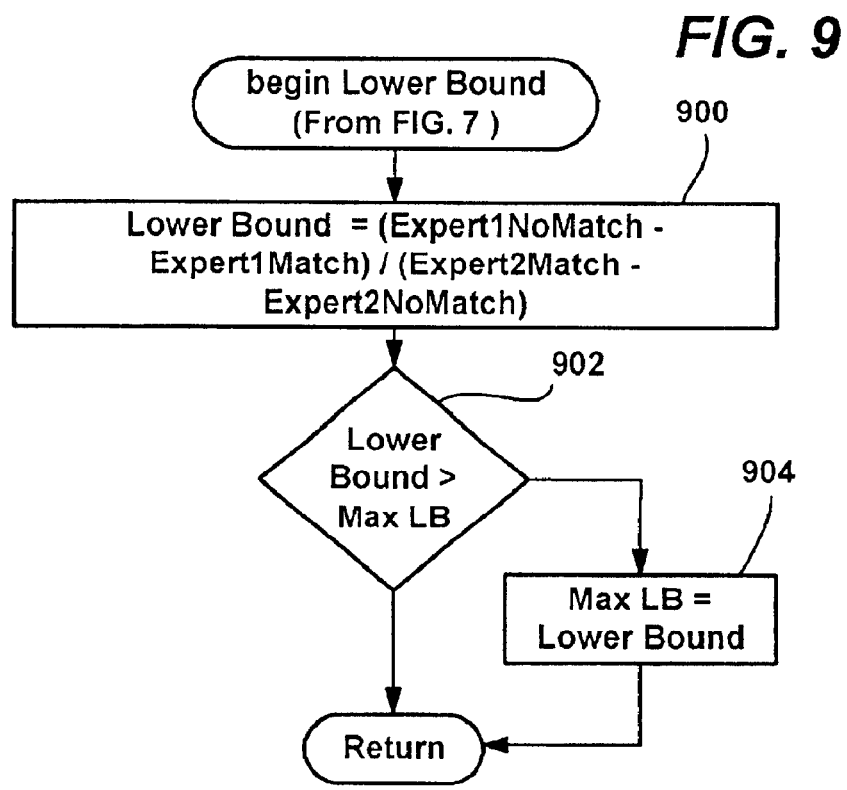

Step 608 represents one way in which the range determination mechanism 300 may determine the weight range for the selected sample, described in more detail in FIGS. 7–9, beginning at step 700. Note that these flow diagrams are only general descriptions of the logic, and are not intended to represent the exact instructions that perform the functionality described therein.

Step 700 initially selects the first matching element in the list, and initializes variables for tracking upper and lower bounds, as described below. For example, the upper bound variable can be initialized to something higher than possible, while the lower bound variable can be initialized to zero. Step 702 selects the first non-matching element in the list.

At step 704, the expert1 scores of the matching and non-matching elements are compared, to start the determination of which of the four possible cases (described above with the examples of TABLES 1–4) the sample fits into. If expert1's matching score is lower than expert1's non-matching score, than either case one or case three is present, in which event step 704 branches to step 706 to resolve which one it is. If expert1's matching score is not lower than expert1's non-matching score, then either case two or case four is present, in which event step 704 branches to step 708 to resolve which of those cases (two or four) it is. Note that at step 704, equal scores are treated as "not less than" scores, however an equal score may be arranged to branch the opposite of that shown, such as if deemed more efficient to do so. However, as described below, step 706 needs to be a less than or equal comparison, while step 708 needs to be a less than comparison, to avoid divide by zero errors.

At step 706, the expert2 scores portion of the elements for the currently selected prototype are compared. Case 1, described above, occurs when both Expert1's and Expert2's scores are both lower (i.e., better) for the matching prototype than the prototype's non-matching scores. If so, this matching prototype will outscore the non-matching one for any weight value whatsoever, which means that this non-matching one cannot be the best the recognizer will ever return for this sample (although it does not guarantee that the matching one will be the best). Note that the circled numeral one (1) in FIG. 7 adjacent the branch from step 706 to step 712 represents this case one state.

Step 712 then tests if at least one other non-matching prototype element remains to be compared against the current matching one, and if so, returns to step 702 to select this next non-matching element and repeat the comparisons.

If step 704 finds that Expert1 has a lower (better) score for the matching versus the non-matching prototype, but step 706 finds that Expert2 has a higher (worse) score for the matching versus non-matching prototype, then an upper bound on the weight exists. In this (case 3) occurrence, step 706 branches to FIG. 8, step 800 to evaluate the upper bound.

Using the formulas described above, step 800 determines what the upper weight bound is via the formula:

Upper Bound=(Expert1Match−Expert1NoMatch)/(Expert2NoMatch−Expert2Match)

Step 802 then determines whether this upper bound is lower than any other upper bound for this matching element. At this time, since the minimum upper bound has been initialized to a relatively high value, the calculated upper bound will be lower, and thus at step 804 the just-calculated upper bound becomes the lowest upper bound (so far) for this matching element. In this way, as other upper bounds are calculated with the scores for the other non-matching prototypes, the least upper bound of the range is determined for this matching element. The process returns to step 712 to repeat the comparison on the next non-matching element, until no more remain, as described below.

Returning to step 704 to describe the other possible branch, as described above, case two exists when the scores for Experts 1 and 2 are each higher (i.e., worse) for the matching prototype versus each respective expert's non-matching prototype score. If so, the non-matching prototype will outscore the matching prototype for any weight value, so further processing on this matching element need not be performed, and instead the next matching element is selected for evaluation. To this end, steps 704 and 708 detect this case two condition, whereby step 714 repeats the process with the next matching element by returning to step 700 until no more remain to be evaluated.

The other possibility is case four, detected by steps 704 and 708 finding that Expert1 has a higher (worse) score for the matching versus the non-matching prototype, but Expert2 has a lower (better) score for the matching versus non-matching prototype. In this event, a lower bound on the weight exists. In this (case 2) occurrence, step 708 branches to FIG. 9, step 900 to evaluate the lower bound. FIG. 9 is essentially a mirror image of FIG. 8, described above.

Thus, using the formulas described above, step 900 determines what the lower weight bound is via the formula:

Lower Bound=(Expert1NoMatch−Expert1Match)/(Expert2Match−Expert2NoMatch)

Step 902 then determines whether this lower bound is higher than any other lower bound for this matching element. At this time, since the maximum lower bound has been initialized to zero, the calculated lower bound will be higher, and thus at step 904 the just-calculated lower bound becomes the highest lower bound (so far) for this matching element. In this way, as other lower bounds are calculated with the scores for the other non-matching prototypes, the highest lower bound of the range is determined for this matching element.

As can be seen via steps 700–712, the process repeats on the selected matching element versus every non-matching element. When the non-matching elements have been evaluated, step 712 branches to step 716 which looks at the actual minimum upper bound and maximum lower bound, to determine whether the range is unbounded. This is because in order for a given matching prototype to produce a correct classification for the current sample, the weight must be greater than all the lower bounds and less than all the upper bounds (note that if the range is empty, there is no weight value that can make this matching prototype beat all the non-matching ones). If the range is unbounded, this matching prototype will be selected by the recognizer no matter what weight is used, whereby step 716 aborts the loop and proceeds to the next sample, until none remain (FIG. 6, step 614). Otherwise, the maximum upper bound and the minimum lower bound are recorded in the range array at step 718, and step 720 continues to the next matching prototype until none remain.

When a sample (not discarded via step 716) has had its ranges determined in the above-described manner, i.e., until no more matching elements remain at step 720, the process continues to merge the ranges via the range merging mechanism 308, described above.

Figure 10:
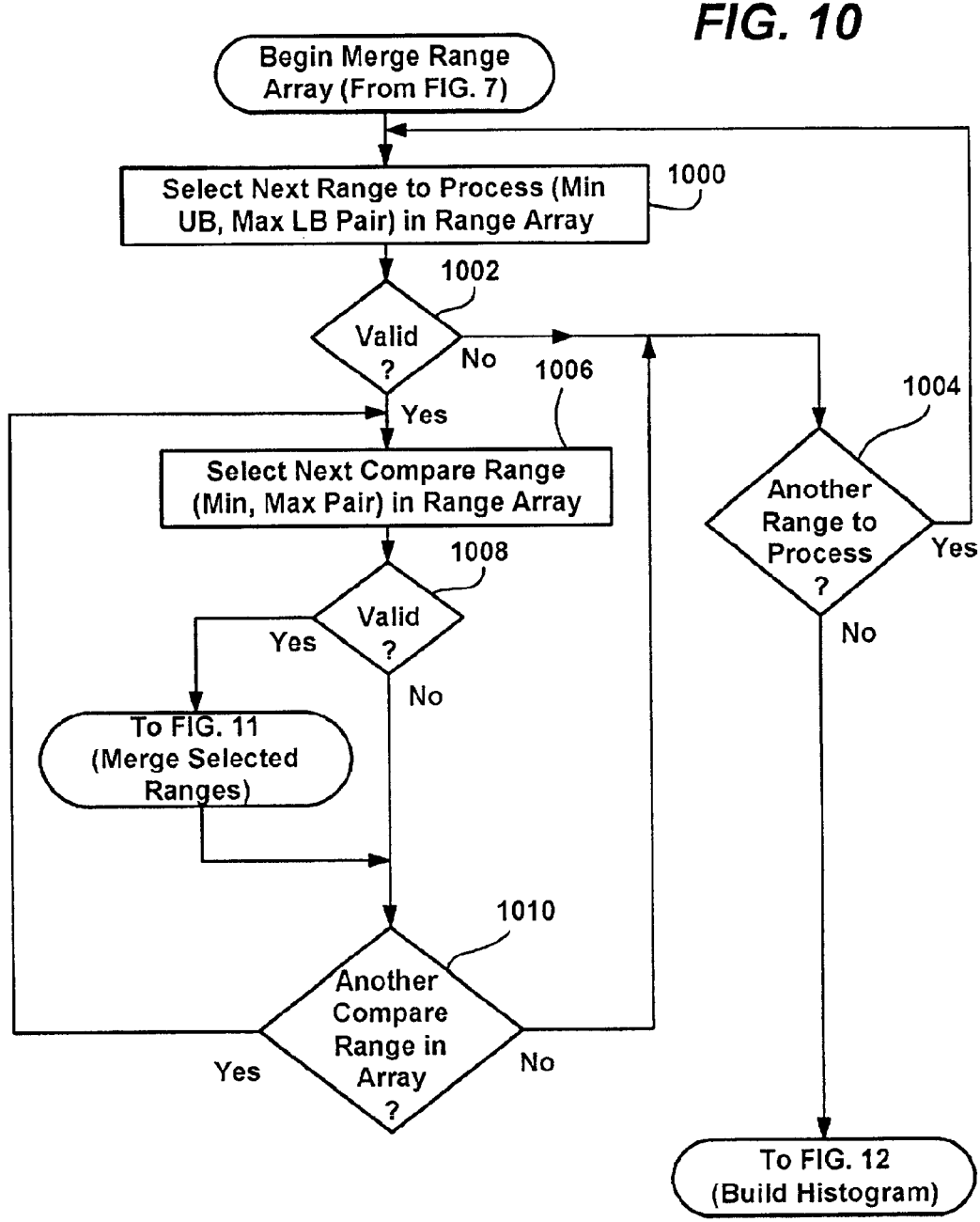

To merge the range array, steps 1000–1004 of FIG. 10 finds and selects the first range (recorded upper and lower bound pair) to be processed, for comparison against the next range in the array, selected via steps 1006–1010. referred to herein as the compare range. The steps of FIG. 11 are then performed to merge the ranges, if possible.

Figure 11:
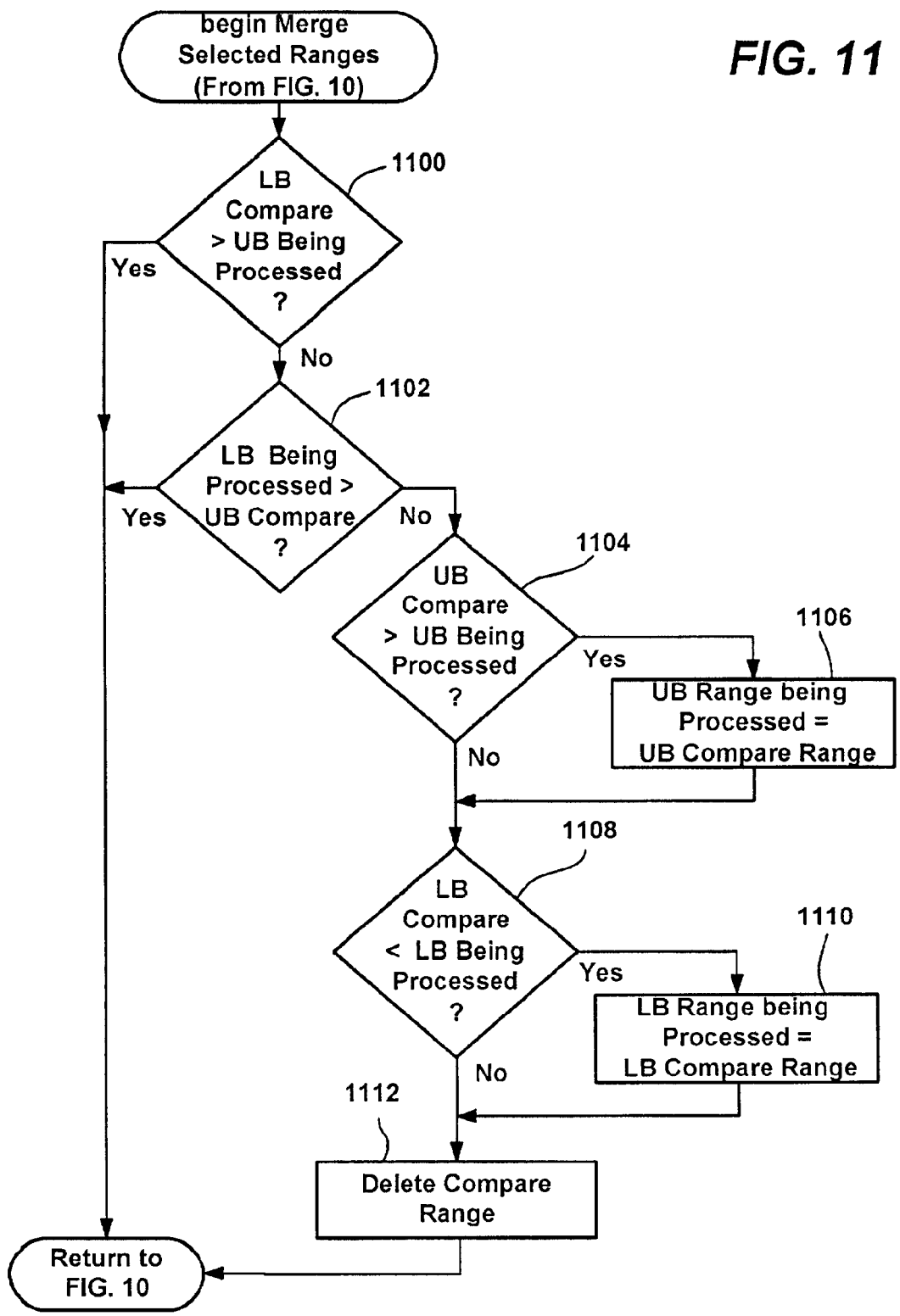

More particularly, steps 1100–1102 of FIG. 11 determine if there is any overlap, i.e., whether the lower bound of either range is greater than the other range's upper bound. If there is no overlap, there is nothing to merge, and step 1100 or 1102 returns to FIG. 10 to find another range to compare for attempted merging.

If there is some overlap, the ranges are merged via steps 1102–1112. In general, when the compare range has a larger upper bound than the top range being processed, steps 1104 and 1106 change the upper bound to this larger value. Similarly, steps 1108 and 1110 obtain the lowest of the lower bounds. Step 1112 removes the merged compare range from the array, by copying a range from the bottom of the array over it, and shrinking the array by decrementing a count of the range size. So that the copied range is tested for merging, the loop index is also decremented.

FIGS. 10 and 11 repeat the selection and merging process until this first array cannot be merged with any other ranges below it, that is, it is disjoint (no overlap) with respect to any other ranges below it. At this time, the next range in the array is selected, and the process repeated for ranges below this next range. The result is a merged range array 310 with only (one or more) disjoint ranges in it.

Figure 12:
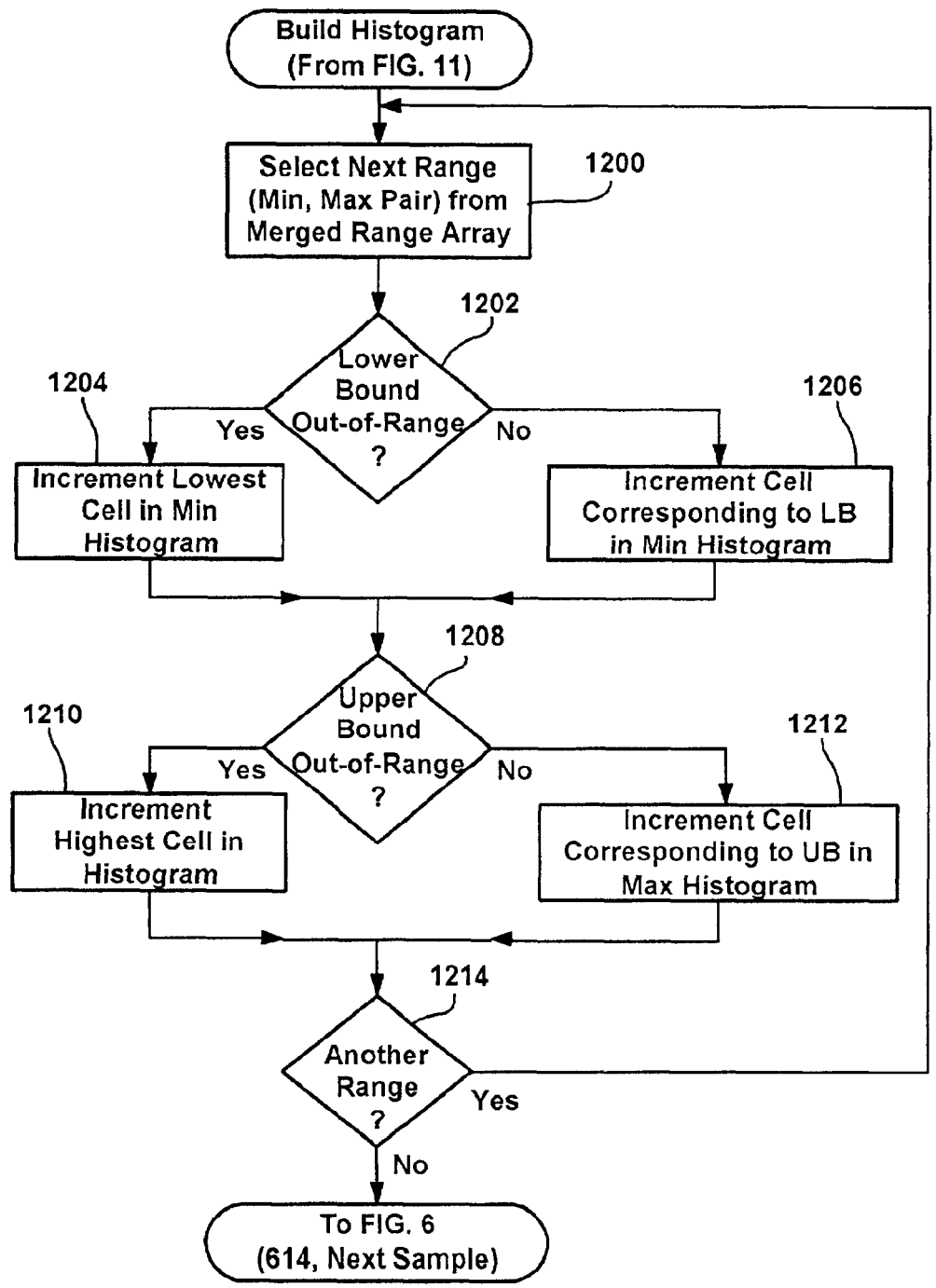

FIG. 12 then accounts for this sample in the histogram. Step 1200 selects the first (disjoint) range, and if there is no valid lower bound at step 1202 or one below the lowest allowed, increments the lowest cell in the minimum histogram via step 1204, or increments the one that corresponds to the lower bound in the range via step 1206. Steps 1208–1212 do the same for the upper bound in the maximum histogram, with any out-of-range values incremented in the last cell. Step 1214 repeats the process for any other disjoint ranges for this sample.

At this point, processing of this sample is complete, and step 1214 returns to FIG. 6, step 614, to repeat the process on the next sample.

Figure 13:
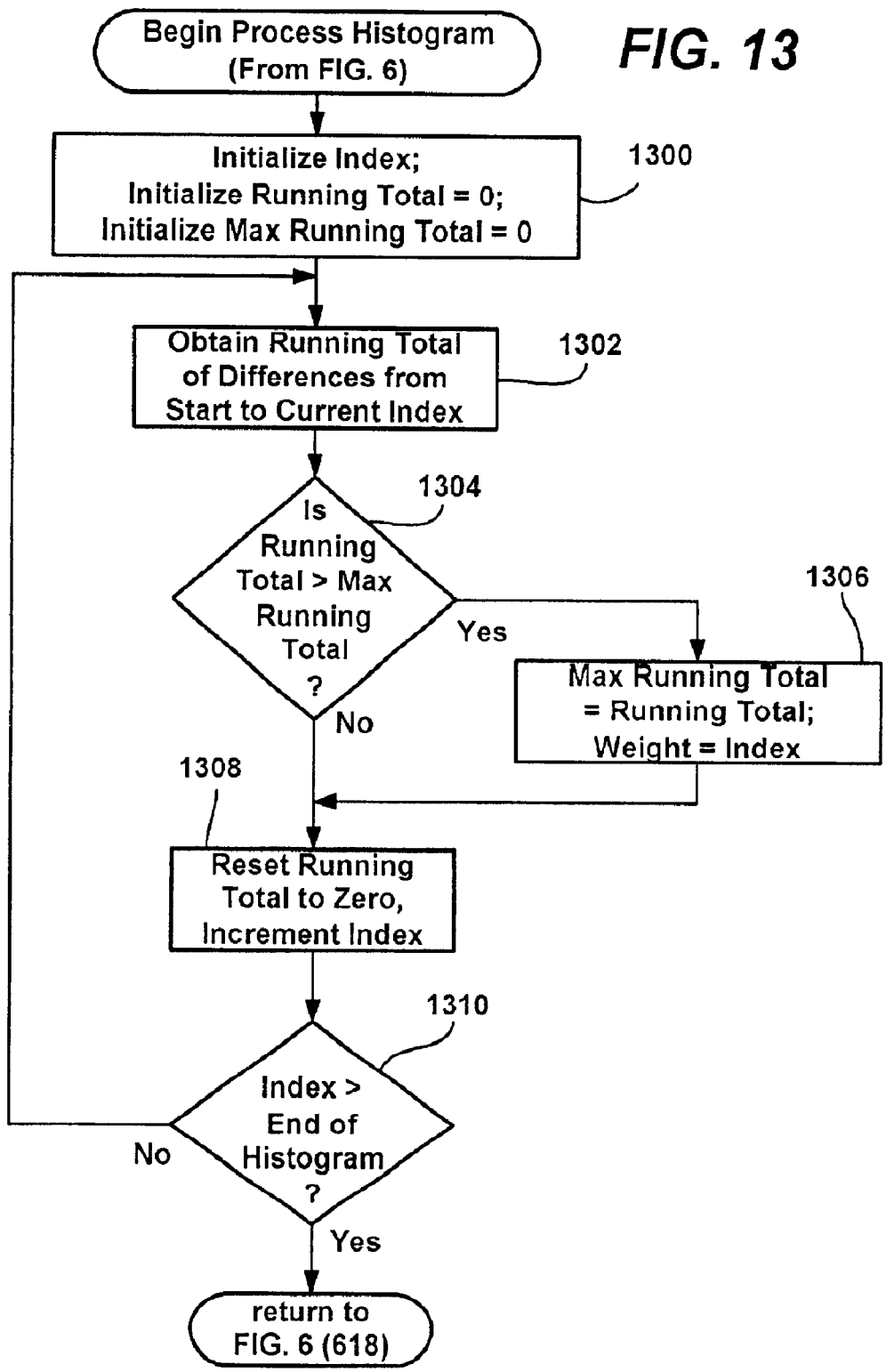

Once the tuning samples have been processed via steps 600–614, step 614 branches to step 616 to process the histogram, as described in more detail with respect to FIG. 13. In general, for any given entry, the summed values in the histogram of minima up to that entry represents a number of errors corrected by making the weight at least as high as the weight represented by that entry. For any given entry, the summed values in the histogram of maxima up to that entry represents a number of errors caused by making the weight at least as high as the weight represented by that entry. Thus, if a running total of the differences up to an entry is maintained for each entry, the entry having the maximum associated total will represent a weight that fixes the most and causes the least errors, which is the desired weight to use.

More particularly, step 1300 initializes an entry index to start at the first cell after zero, (e.g., 0.001 in the example histograms of FIG. 5), and initializes two variables used in the calculation described below, namely the one for storing the current running total and the one for tracking the maximum running total, to zero.

Step 1302 represents summing the differences in the histogram up to the current index, which can be accomplished by simply keeping the running total obtained via the previous loops (if any) through the process, and adjusting the running total for the current loop. Mathematically, this running total may be represented via a function:

$$\text{Running total}(q) = \sum_{i=0.00}^{q} L(i) - U(i-1)$$

where q represents the cell index for which the running total is being calculated, i the summation index, L(i) represents the lower bound value in each cell as indexed by i in the minimum histogram, and U(i−1) represents the previous upper cell. In this example, the index increases in 0.001 increments up to q, but of course this incremental value depends on the histogram resolution. Note that for certain values the running total may be negative (indicating a weight that breaks more than it fixes).

With sufficient amounts of data, however, there is likely to be many weights that fix more scores than they break. Steps 1304 and 1306 record the maximum of these as the summation formula is run across the cells. The index at which the maximum occurs is also tracked, since this indicates the best weight found so far. Steps 1308 and 1310 repeat the process for all the cells in the histogram. When finished, the optimal weight is known via step 1306, and the process returns to FIG. 6, step 618 to apply the weight to Expert2.

Step 620 represents testing the recognizer as described above, possibly fine-tuning and or trying a few alternative weights as described above. It should be noted that with sufficient amounts of data, however, anomalies are not found and the weight determined to be optimal by the method and system of the present invention is in fact clearly correct.

While the above invention has been described with respect to tuning two experts, it can be used in a straightforward way to tune three or more experts. In general, this is done by iteration, with values found by tuning one expert at a time, and then using those values to determine other values and thereby converge on the correct relative weights.

For example, consider three experts, A, B and C. Any score output when the recognizer is fully trained and tuned is the sum of all three experts results, two of which have weights:

$S=A+K1*B+K2*C$

To determine the K values, the K values are initially set to one. Then, each K value is computed in isolation, after which all are changed to their recomputed values together. The process is iteratively repeated, starting each time with the previously recomputed K values. In practice, this iterative method converges on the proper K1 and K2 values quickly, in two to three iterations.

Lastly, while the present invention has been described in the context of multiple experts within a single recognizer, it is readily appreciated that the results of different recognizers, including those of entirely different types (such as recognizers based on Neural Nets, Hidden Markov Models (HMM) and/or K-NN), may be combined in a similar, tuned manner. For example, as long as two or more recognizers output choices and some mathematical number with each choice, the results from each recognizer may be mathematically combined external to the recognizers. Each recognizer may have its result tuned (e.g., its output weighted) in accordance with the present invention to arrive at a final score. Thus, as used herein, an expert in a multiple expert recognizer is equivalent to a recognizer in a multiple recognizer system.

As can be seen from the foregoing detailed description, there is provided an efficient method and system for tuning linear parameters in a handwriting or speech recognizer. The method and system operate in O(n) time, where n is the number of samples in the tuning set. The method is extensible to tune multiple experts.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing device having a first expert and a second expert that recognize user input, a method of determining a parameter to tune the second expert relative to the first expert so that a mathematical combination of recognition results from the first and second experts increases overall recognition accuracy, comprising:
   a) selecting a tuning sample from a set, each sample comprising input data and a label indicating an intended meaning of the input data;
   b) applying the tuning sample to the first expert to obtain a first matching set of scores corresponding to prototypes that match the label and a first non-matching set of scores corresponding to prototypes that do not match the label;
   c) applying the tuning sample to the second expert to obtain a second matching set of scores corresponding to prototypes that match the label and a second non-matching set of scores corresponding to prototypes that do not match the label;
   d) comparing at least some of the matching scores in the first matching set to at least some of the non-matching scores in the first non-matching set, and at least some of the matching scores in the second matching set to at least some of the non-matching scores in the second non-matching set, to determine at least one range of parameter values that when applied to the second expert do not change a correct result of the first expert to an incorrect one or improve recognition by correcting an incorrect result of the first expert;
   e) recording range data about each range in a data structure;
   f) repeating b) through e) for a plurality of other samples, whereby the data structure includes data about a plurality of ranges; and
   g) analyzing the range data in the data structure to determine a parameter value that provides better recognition accuracy when the second expert is tuned therewith than when tuned with other parameter values.

2. The method of claim 1 wherein the tuning sample input data comprises a chirograph and the label comprises a code point.

3. The method of claim 1 wherein comparing at least some of the matching scores in the first matching set to at least some of the non-matching scores in the first non-matching set, and at least some of the matching scores in the second matching set to at least some of the non-matching scores in the second non-matching set, to determine at least one range of parameter values that when applied to the second expert improve recognition by correcting the first expert includes, selecting a matching element comprising scores from the first and second matching sets, and selecting a non-matching element comprising scores from the first and second non-matching sets.

4. The method of claim 3 wherein the matching element is compared with the non-matching element to determine whether:
   i) the first matching score and second matching scores are better than the first non-matching score and the second non-matching score, respectively;
   ii) the first matching score and second matching scores are not better than the first non-matching score and the second non-matching score, respectively;
   iii) the first matching score is better than the first non-matching score and the second matching score is not better than the second non-matching score; or
   iv) the first matching score is not better than the first non-matching score and the second matching score is better than the second non-matching score.

5. The method of claim 4 wherein the first matching score and second matching scores are not better than the respective first non-matching score and the second non-matching score, and further comprising, selecting another matching element.

6. The method of claim 4 wherein the first matching score is better than the first non-matching score and the second matching score is not better than the second non-matching score, and further comprising, recording an upper bound for the range.

7. The method of claim 6 wherein recording an upper bound for the range includes determining that the upper bound is lower than another upper bound previously recorded for the sample.

8. The method of claim 4 wherein the first matching score is not better than the first non-matching score and the second matching score is better than the second non-matching score, and further comprising, recording a lower bound for the range.

9. The method of claim 8 wherein recording a lower bound for the range includes determining that the lower bound is higher than another lower bound previously recorded for the sample.

10. The method of claim 1 further comprising, merging the range data for the selected sample before recording the range data.

11. The method of claim 1 wherein recording range data about each range in a data structure comprises incrementing a counter in a minima histogram and a maxima histogram based on the range data.

12. The method of claim 11 wherein analyzing the range data in the data structure comprises, obtaining a total of the differences of the counters in the minima histogram minus the counters of the maxima histogram up to a given index.

13. The method of claim 12 wherein the parameter value is based on the maximum total of a set of totals obtained for a plurality of indexes.

14. A computer-readable medium having computer-executable instructions for performing the method of claim 1.

15. A system for tuning a second expert relative to a first expert, comprising:

a range determination mechanism that applies samples of labeled recognizable data to a first expert and a second expert, each sample when applied resulting in a first matching set of scores and a first non-matching set of scores from the first expert, and a second matching set of scores and a second non-matching set of scores from the second expert, at least some of the matching and non-matching scores defining upper and lower bounds of a range of tuning parameters when compared relative to one another, and the range determination mechanism storing upper and lower bound information in a range array for at least one of the samples;

a range merging mechanism that for each range array, merges overlapping ranges therein into a merged range array;

a histogram building mechanism that increments at least one counter in a minima histogram based on any lower bound information in the merged range array and increments at least one counter in a maxima histogram based on any upper bound information in the merged range array; and a histogram analysis mechanism that analyzes the counters in the maxima and minima histograms to determine a parameter value that tunes the second expert relative to the first to in a manner that improves overall recognition relative to other parameter values.

16. The system of claim 15 wherein the samples of labeled recognizable data each comprise a chirograph and an associated code point.

17. The system of claim 15 wherein each expert obtains the matching and non-matching scores by comparing the sample against information in a prototype database.

18. The system of claim 15 wherein the range determination mechanism determines an upper bound when a selected first matching element score is better than a selected first non-matching element score, and a corresponding selected second matching element score is not better than a corresponding selected second non-matching element score.

19. The system of claim 18 wherein the range determination mechanism tracks the lowest upper bound for a selected matching element.

20. The system of claim 15 wherein the range determination mechanism determines a lower bound when a selected first matching element score is not better than a selected first non-matching element score, and a corresponding selected second matching element score is better than a corresponding selected second non-matching element score.

21. The system of claim 20 wherein the range determination mechanism tracks the highest lower bound for a selected matching element.

22. In a computing device having a first expert, a second expert and a third expert that recognize user input, a method of determining one parameter to tune the second expert and another parameter to tune the third expert relative to the first expert so that a mathematical combination of recognition results from the first, second and third experts increases overall recognition accuracy, the method comprising:

a) selecting only the first expert as a combined expert and a selected one of the second or third experts as a selected other expert and the non-selected one as the non-selected expert;

b) selecting a tuning sample from a set, each sample comprising input data and a label indicating an intended meaning of the input data;

c) applying the tuning sample to the combined expert to obtain a first matching set of scores corresponding to prototypes that match the label and a first non-matching set of scores corresponding to prototypes that do not match the label;

d) applying the tuning sample to the selected other expert to obtain a second matching set of scores corresponding to prototypes that match the label and a second non-matching set of scores corresponding to prototypes that do not match the label;

e) comparing at least some of the matching scores in the first matching set to at least some of the non-matching scores in the first non-matching set, and at least some of the matching scores in the second matching set to at least some of the non-matching scores in the second non-matching set, to determine at least one range of parameter values that when applied to the selected other expert do not change a correct result of the combined expert to an incorrect one or improve recognition by correcting an incorrect result of the combined expert;

f) recording range data about each range in a data structure;

g) repeating c) through f) for a plurality of other samples, whereby the data structure includes data about a plurality of ranges;

h) analyzing the range data in the data structure to determine a parameter value that provides better recognition accuracy when the selected other expert is tuned therewith than when tuned with other parameter values;

i) selecting the first and selected other expert with the parameter value applied thereto as the combined expert, and selecting the non-selected expert as a new selected other expert; and j) repeating steps b)–h) at least one other time to obtain a new parameter value for the newly selected other expert.

* * * * *